United States Patent [19]

Chang et al.

[11] Patent Number: 4,655,926
[45] Date of Patent: * Apr. 7, 1987

[54] PROCESS OF TREATING EFFLUENT FROM A PULP OR PAPERMAKING OPERATION

[75] Inventors: Hou-min Chang; Thomas W. Joyce, both of Raleigh, N.C.; Thomas K. Kirk, Madison, Wis.

[73] Assignee: North Carolina State University, Raleigh, N.C.

[*] Notice: The portion of the term of this patent subsequent to Nov. 19, 2002 has been disclaimed.

[21] Appl. No.: 614,981

[22] Filed: May 29, 1984

[51] Int. Cl.$^4$ .............................................. C02F 3/34
[52] U.S. Cl. .................................. 210/611; 210/619; 210/928; 210/911; 435/262; 162/29
[58] Field of Search ................ 210/611, 928, 615–619, 210/631, 908, 909, 917; 162/29, 189; 435/262, 267, 911

[56] References Cited

U.S. PATENT DOCUMENTS

| | | | |
|---|---|---|---|
| 2,382,010 | 8/1945 | Hodges | 210/2 |
| 3,660,278 | 5/1972 | Mimura et al. | 210/611 |
| 3,737,374 | 6/1973 | Stern et al. | 210/11 X |
| 3,833,463 | 9/1974 | Croom | 162/29 |
| 3,870,599 | 3/1975 | Azarowicz | 210/611 X |
| 3,876,497 | 4/1975 | Hoffman | 162/189 |
| 3,945,917 | 3/1976 | Foster | 162/29 X |
| 3,962,033 | 6/1976 | Eriksson et al. | 195/8 |
| 4,000,033 | 12/1976 | Nicolle et al. | 162/29 |
| 4,199,444 | 4/1980 | Blair et al. | 210/11 |
| 4,266,035 | 5/1981 | Blair et al. | 435/253 |
| 4,554,075 | 11/1985 | Chang et al. | 210/611 |

OTHER PUBLICATIONS

Chang et al, "Fungal Decolorization of Bleach Plant Effluents", 1983, UNI Publishers, Japan.
Gabriel Sundman, T. Kent Kirk & Hou-min Chang; Fungal Decolorization of Kraft Bleach Plant Effluent: Fate of the Chromophoric Material; Mar. 1981; pp. 1–5.
David C. Eaton, Hou-min Chang, Thomas W. Joyce, Thomas W. Jeffries and T. Kent Kirk; The FPL/NCSU Mycor Process for Treatment of Bleach Plant Effluents; Mar. 1981; pp. 1–5.
Alton G. Campbell, Jr. and Thomas W. Joyce; The Removal of Color from Pulp and Paper Mill Effluents by Biological Processes; May 1981; 16 pages.
T. Kent Kirk and Wayne E. Moore; Removing Lignin from Wood with White-Rot Fungi and Digestibility of Resulting Wood; Jan. 1972, pp. 72–79.
T. Kent Kirk, W. J. Connors and J. Gregory Zeikus; Requirement for a Growth Substrate during Lignin Decomposition by Two Wood-Rotting Fungi; Jul. 1976; pp. 192–194.
Knut Lundquist, T. Kent Kirk and William J. Connors; Fungal Degradation of Kraft Lignin and Lignin Sulfonates Prepared from Synthetic $^{14}$C-Lignins; 1977; Arch. Microbiol. 112, pp. 291–296.
Toshio Fukuzumi, Atsumi Nishida, Kiyowo Aoshima and Kyoji Minami; Decolourization of Kraft Waste Liquor with White Rot Fungi. I.; Mokuzai Gakkaishi, vol. 23, No. 6, pp. 290–298; 1977.
D. Eaton and H-m. Chang and T. K. Kirk; Fungal Decolorization of Kraft Bleach Plant Effluents; Oct. 1980; pp. 103–106.
David C. Eaton, Hou-min Chang, Thomas W. Joyce, Thomas W. Jeffries and T. Kent Kirk; Method Obtains Fungal Reduction of the Color of Extraction-Stage Kraft Bleach Effluents; Jun. 1982; pp. 89–92.
A. G. Campbell, E. D. Gerrard, T. W. Joyce, and H-m. Chang and T. K. Kirk; The Mycor Process for Color Removal from Bleach Plant Effluent: Bench Scale Studies; Aug./Sep. 1982; pp. 209–214.

Primary Examiner—Tom Wyse
Attorney, Agent, or Firm—Bell, Seltzer, Park & Gibson

[57] ABSTRACT

A process of treating effluent from a pulp or paper-making operation to decolorize the effluent is provided in which a white-rot fungus is germinated and grown and is then induced into a secondary metabolic state. The white-rot fungus is then immersed in the effluent where the fungus' active ligninolytic system decolorizes the effluent. The rate of fungal activity and the active lifetime of the fungus is increased by the addition to the effluent of at least one member of the class consisting of nutrient nitrogen, nutrient minerals, and a detergent.

11 Claims, 5 Drawing Figures

PROCESS OF TREATING EFFLUENT FROM A PULP OR PAPERMAKING OPERATION

This invention relates to the biological treatment of wastewater to improve the environmental character thereof and particularly to a process for the fungal treatment of effluent from a pulp or paper-making operation to decolorize the effluent.

BACKGROUND OF THE INVENTION

Environmental concerns are becoming increasingly more prevalent and are having more pronounced effect on many industries which generate wastes which have environmental impact. One such industry is the United States pulp and paper industry which generates effluents which present environmental concerns. Future water pollution and other environmental regulations may require this industry to reduce substantially the color and other constituents in its effluents. While the effluents from most pulp or paper-making operations contain lignin or its degradation products, the effluents from the first alkaline extraction stage in the chlorine bleach plant are of special concern because they are the major source of color and other undesirable constituents in pulp and paper-making effluents. The main contributors to such undesirable constituents in bleach plant effluents are polymeric, chlorinated, heavily oxidized degradation fragments of lignin.

Certain proposals have been advanced for reducing the effluent volume through recycling and for color removal, but such proposals have not been accepted as solutions to the problem. Such bleach plant effluents are not easily recycled because of the potential corrosion problems created by their high chlorine content. Further, color removal by either oxygen bleaching or dynamic bleaching and some tertiary color removal processes, such as ultrafiltration, carbon adsorption and lime precipitation, have been investigated, but implementation of these processes would be prohibitively expensive and therefore have not been adopted.

There have been attempts at using various biological processes to decolorize effluents. These processes have met with varying success, but none have proven practical for industrial or commercial use. One study has shown that various isolated fungi can remove up to 80% of the color from kraft pulp mill effluents, in batch reactions. Nova Scotia Research Foundation, Environment Canada, Cooperative Pollution Abatement Research Project Report No. 208-1 (1974). However, when this process was scaled up and run on a continuous basis to stimulate industrial conditions, only 50% decolorization was achieved. An attempt has also been made to use algae to decolorize kraft bleach plant effluents. British Columbia Research, Environment Canada, Cooperative Pollution Abatement Research Project Report No. 410-1 (1976). The algae method only removes 70% of the color after 20 days. This time lag prohibits use of the process by industry. Another group has attempted to use white-rot fungi to decolorize effluents. Fukuzumi, Nishida, Aoshima, and Minami, *Decolorization of Kraft Waste Liquor with White-Rot Fungi* (pt. 1), 23 (6) Journal of the Japan Wood Research Society 290 (1977). Although the process removes up to 90% of the color, it requires an extremely complex growth medium containing glucose or ethanol, asparagine, and aspartic acid, among other things. No attempt was made to recycle the fungal biomass, or to use spent mycelium as a secondary source of carbon and nitrogen for the fungi. No recognition was made that nutritional conditions must be different for separate stages of fungal growth and decolorization of effluents. Also, the process was much too slow and the active lifetime of the fungus too short for adaptation to industrial or commercial use.

With the foregoing in mind, it is an object of the present invention to provide a low-cost, industrial or commercial process of treating effluent from a pulp or paper-making operation to improve the environmental character thereof.

A more specific object of the present invention is to provide a process of treating effluent with a white rot fungus to degrade lignin and its polymeric degradation products in which the rate of decolorization, total color units removed and active lifetime of the fungus are greatly increased.

SUMMARY OF THE INVENTION

In accordance with the present invention, there is provided a process of treating effluent from a pulp or paper-making operation to improve the environmental character thereof in which a white rot fungus is grown to form mycelial mats and is then induced into a secondary metabolic state by nitrogen starvation. The white-rot fungus in the secondary metabolic state is immersed in the effluent where the fungus' active ligninolytic systems serve to degrade or modify the lignin and its polymeric degradation products and to thereby decolorize the effluent and convert other undesirable constituents into harmless, readily acceptable by-products. At least periodically during the immersion of the fungus in the effluent, the fungus is supplied with oxygen to increase the rate of fungal activity and to increase the lifetime of the fungus. The rate of fungal activity and the lifetime of the fungus are even further increased in accordance with this invention by supplying the fungus with at least one member of the class consisting of nitrogen, a mixture of nutrient minerals, and a detergent. Finally, the rate of fungal activity is greatly increased by suppling the fungus with a combination of the mixture of nutrient minerals and the detergent.

DESCRIPTION OF THE PREFERRED EMBODIMENT

Most microorganisms, including those used in current wastewater treatment systems, cannot degrade lignin or its polymeric degradation products. White rot fungi, on the other hand, have active ligninolytic systems that will degrade even heavily modified lignin. Though this process can use any of many white rot fungi, *Phanerochaete chrysosporium* strain BKM F-1767, isolated in east central Russia in 1968, is preferred because of its vigorous growth and rapid decolorization at the relatively high temperature of 39°–40° C. and because of its formation of abundant conidia (asexual spores) which facilitates inoculation and handling.

The first step in the present process is the growing of the white rot fungus to provide a readily available source of the active ingredient of the decolorization process. Such growth should take place under sterile or semi-sterile conditions in a stationary liquid medium containing medium and sufficient basal nutrients for rapid germination and growth.

The following nutrients were used in our experiments in the amounts stated in grams per liter of liquid medium:

| Nutrient | Amount |
| --- | --- |
| $KH_2PO_4$ | 2 g/l |
| $MgSO_4.H_2O$ | 0.5 g/l |
| $CaCl_2$ | 0.1 g/l |
| $NH_4Cl$ | 0.12 g/l |
| Thiamine | 0.001 g/l |
| Glucose | 10 g/l |

The temperature of the growth media should be 30°–40° C., the pH should be 4.0–5.0 and the surrounding atmosphere should have an oxygen content of 20%–100%.

Figure 1:
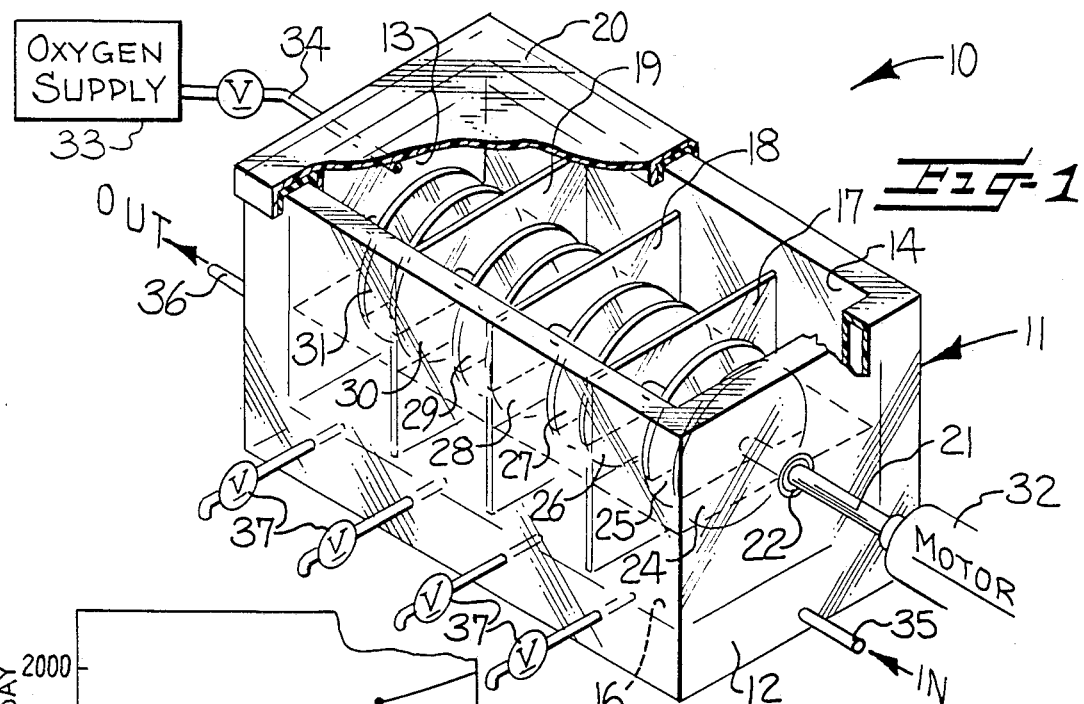
FIG. 1 is a perspective view of one type of reactor that may be used in the practice of the present process.

While any suitable apparatus or equipment for growing the fungus and decolorizing the effluent may be used, a rotating biological contact reactor has proven to be effective in bench scale experiments and some similar production scale equipment is anticipated to be equally effective when the present process is scaled up to production capacity. Such a rotating biological contact reactor is shown in FIG. 1 and is generally referred to as 10. Reactor 10 offers unique operating features including high surface area per unit volume, low maintenance costs, low energy requirements, simple construction and operation, and commercial availability.

The reactor 10 comprises a tank 11 defined by four walls 12, 13, 14 and 15 and a bottom 16, and three partitions 17, 18 and 19 extend between walls 14 and 15 to divide the tank 11 into four compartments. A cover 20 is provided so that the atmosphere within reactor 10 may be controlled. A shaft 21 is journaled for rotation in suitable bearings 22 (only one of which is shown) mounted in walls 12 and 13. Shaft 21 drivingly mounts eight plastic discs 24, 25, 26, 27, 28, 29, 30 and 31 with two discs being located in each of the four compartments of tank 11. A suitable motor 32 is connected to shaft 21 for driving shaft 21 and discs 24–31 in rotation for reasons to be explained.

The reactor 10 may be operated as a batch reactor or as a continuous, plug-flow reactor. Experiments were conducted as batch operations to aid monitoring of color and pH changes as a function of time. The reactor 10 used in these experiments had a capacity of 2.5 liters of effluent being treated. The tank 11 and discs 24–31 were constructed of such size that the discs were 40% submerged in the effluent when tank 11 had 2.5 liters of effluent therein.

An oxygen source 33 is connected to tank 11 above the level of effluent therein by tubing 34 to maintain an atmosphere enriched with oxygen above the effluent and in contact with 60% of discs 24–31. The desired temperature of approximately 40° C. is maintained by circulating water through a jacket around tank 11 from a source of hot water (not shown) connected to tank 11 by tubing 35 and 36. Suitable drains 37 for removal of the decolorized effluent are connected to each compartment of tank 11.

A carbon/energy source is a nutritional requirement for both fungal growth and decolorization, and the effluent to be treated does not normally provide such nutritional requirements. Glucose, cellulose, and inexpensive, commercially available corn syrup work equally well. In fact, our study has demonstrated that primary sludge from the pulp and paper mill may be used to provide such nutritional requirements.

To grow the fungus, a spore suspension is inoculated into an effluent or other growth medium in tank 11 containing growth nutrients at pH 4.5. The spores readily germinate and grow rapidly to form mycelial mats on the roughened discs 24–31. During the first two days, the growing mycelium consumes nutrients and attaches to the roughened discs as a thin film. After these first two days, the growth medium is drained from tank 11 and tank 11 is refilled with effluent containing additional growth media. After two more days of growth, the mycelial mats on discs 24–31 have consumed the available nitrogen and the fungus enters a secondary metabolic state capable of decolorizing effluent solutions. Throughout this growth period, an oxygen enriched atmosphere has been maintained above the effluent containing growth medium, and the discs have been slowly rotated at a peripheral speed of preferably 2 feet per minute.

With the fungus in a secondary metabolic state, decolorization of effluent can now begin. The rate of decolorization is higher at a peripheral speed of 2 feet per minute than at 30 feet per minute and consequently a low peripheral speed is preferred during decolorization. Experiments were conducted with a peripheral speed of 2 feet per minute with excellent results.

Figure 2:
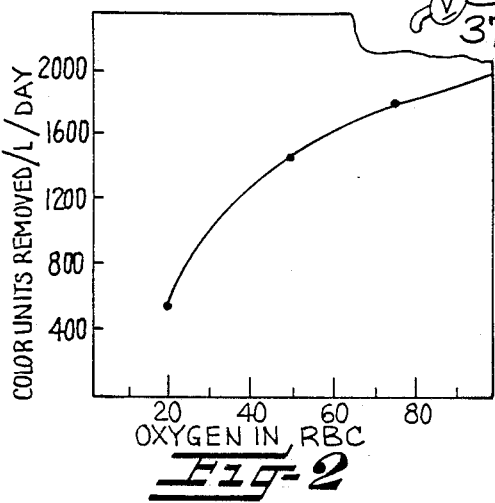
FIG. 2 is a graph illustrating the effect of oxygen concentration on the rate of decolorization.

The concentration of oxygen in the enclosed space above the effluent is an important factor affecting the rate of decolorization and the active lifetime of the fungus. The higher the oxygen concentration the higher the rate of decolorization as is shown in FIG. 2 of the drawings. Most preferably, an oxygen concentration of 50%–100% gives superior results.

Typically, the present process involves treating the effluent for twenty-four hours in tank 11 during which decolorization occurs. The effluent is then drained from tank 11 and the tank 11 is refilled from the top with fresh effluent to be decolorized. The effluent is added to it all requisite nutrients except nitrogen to provide the carbon/energy source referred to above.

Figure 3:
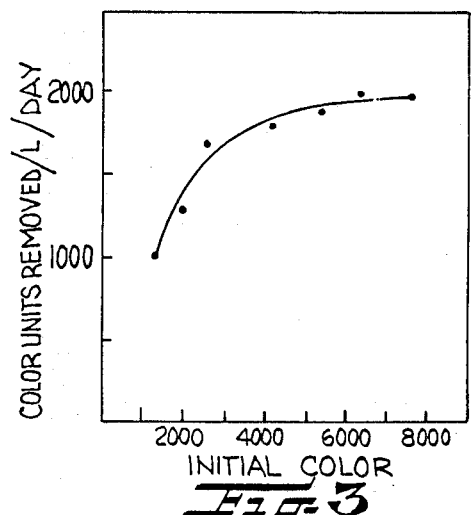
FIG. 3 is a graph illustrating the relationship between initial color and the average color units removed per day.

The relationship between initial color of the effluent and the average color units removed per day in one-day batch operation is shown in FIG. 3. Above 6000 color units of initial color, the rate of fungal decolorization is independent of the initial color concentration in our experiments.

Figure 4:
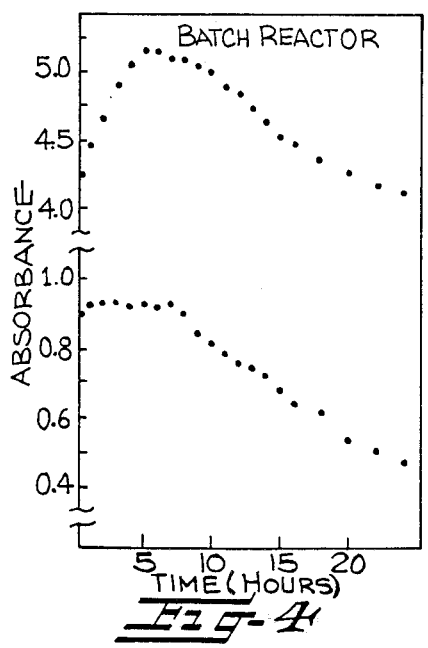
FIG. 4 is a graph illustrating the change in color over a 24-hour period.

Reaction rates in fixed film reactors are typically zero order at high substrate concentrations and first order at low concentrations. In FIG. 4, the change in color over a 24 hour period in batch operation of reactor 10 is shown for an effluent with an initial color of 4,000 color units. A first order plot of absorbance versus time is linear over a 20-hour period following an initial 8 hour lag period. The correlation coefficient of this straight line is 0.998. The same first order reaction was observed for fungal decolorization of effluents of lower initial color concentration. Thus, the decolorization reaction in the reactor 10 appears to be zero order above an initial color concentration of approximately 12,000 color units and first order below this saturation point.

As shown in FIG. 4, the fungal decolorization exhibits a lag period following the introduction of fresh effluent into the reactor 10 and before rapid decolorization begins. The lag period of 7–8 hours remains essentially constant over several cycles of draining and refilling and appears to be independent of the initial color concentration. The reason for the lag period is not known. During the initial lag period, the pH rises rapidly from an initial pH of 4.50 to approximately 5.15–5.20, then a pH decrease appears to coincide with the onset of decolorization (FIG. 4). The pH change is not observed with biologically treated whole mill effluent, nor is it observed when the low molecular weight fraction (<1,000 daltons) is removed from alkali extraction effluents by hollow fiber ultrafiltration. The permeate from ultra-filtration, on the other hand, exhibits an increase in pH when treated with the fungus in the reactor 10. These results suggest that low molecular weight organic acids in the bleach plant effluent are preferentially assimilated by the fungus initially resulting in the observed pH increase. The later, gradual pH decline is likely due to the organic acids produced by the fungal oxidation of lignin. There appears to be no correlation between the pH increase and the concurrent lag period since the lag period is observed even when there is no pH increase (in a strongly buffered effluent).

Figure 5:
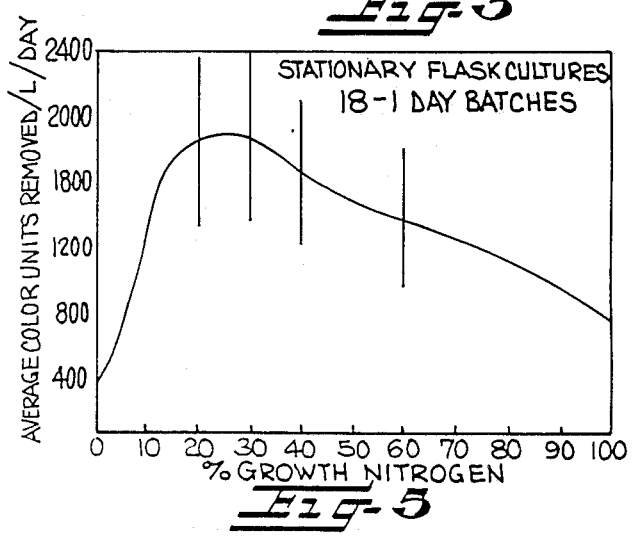
FIG. 5 is a graph illustrating the effect of nutrient nitrogen on rate of decolorization.

We have discovered that the rate of decolorization and the active lifespan of the fungus are markedly increased by the addition of a small amount of nutrient nitrogen to the effluent being treated by the present process. Care must be taken, however, because the addition of too much nitrogen decreases the rate of decolorization and may even cause the fungus to leave its secondary metabolic state and therefore terminate all decolorization. It has been determined that the addition to the effluent of an amount of nutrient nitrogen ($NH_4Cl$) equal to 20–30% of the original growth nitrogen or about 0.024 to 0.036 grams per liter as nitrogen results in a substantive increase in the rate of decolorization, the total color units removed during the active lifetime of the fungus and the duration of the active lifetime of the fungus. The effect of nitrogen addition on the rate of color removal for effluent in stationary flask cultures for 18 one-day batches is shown in FIG. 5. While not producing as large an increase as noted in the flask-scale experiments, the addition of nutrient nitrogen at 30% of the growth nitrogen to effluent in the reactor 10 yielded a 50% increase in the rate of decolorization and the useful life of the fungus was doubled.

We have also discovered that the addition to the effluent of a small amount of a mixture of nutrient minerals (micro-nutrients or micro-minerals) has a very similar effect to that produced by the addition of nitrogen to the effluent. In our experiments, we used the following nutrient minerals at the rate given in grams per liter of effluent being treated:

| | |
|---|---|
| Nitrilotriacetic acid | 0.135 g/l |
| $MgSO_4.H_2O$ | 0.27 g/l |
| NaCl | 0.09 g/l |
| $MnSO_4.H_2O$ | 0.045 g/l |
| $CaCl_2$ | 0.007 g/l |
| $FeSO_4.7H_2O$ | 0.009 g/l |
| $ZnSO_4.H_2O$ | 0.009 g/l |
| $CoCl_2.6H_2O$ | 0.009 g/l |
| $CaSO_4.5H_2O$ | 0.0009 g/l |
| $Na_2MO_4.2H_2O$ | 0.0009 g/l |

| -continued | |
|---|---|
| $AlK(SO_4)2.12H_2O$ | 0.0009 g/l |
| $H_3BO_3$ | 0.0009 g/l |
| Total | 0.58 g/l |

Also, the addition to the effluent of a small amount of biological detergent, i.e., 0.3% by volume, produces a marked increase in the rate of decolorization, total color units removed, and active lifetime of the fungus. An illustrative example of such a detergent is a complex of polyoxyethylene ethers of mixed partial oleic esters of sorbitol anhydrides sold under the brand name Tween-80 by Fisher Scientific Company. Experiments with the reactor 10 have shown that slightly higher increases in rate of decolorization, total color units removed, and active lifetime of the fungus are achieved with the addition of the detergent than with the addition of nutrient nitrogen.

The greatest increases in rate of decolorization, total color units removed, and active lifetime of the fungus are achieved when both a mixture of nutrient minerals and a biological detergent were added to the effluent. Surprisingly, the effect of the minerals and of the detergent are additive producing up to a fourfold increase in the rate of decolorization, total color units removed, and active lifetime of the fungus. This additive effect is not realized when nutrient nitrogen and minerals were added to the effluent and is not realized when nitrogen and detergent are added.

In the drawings and specification, there have been set forth preferred embodiments of the invention, and although specific terms are employed, they are used in a generic and descriptive sense only and not for purposes of limitation.

That which is claimed is:

1. A process of treating effluent from a pulp or paper-making operation to improve the environmental character thereof comprising the steps of
   (a) providing a white-rot fungus which is in a secondary metabolic state,
   (b) immersing the white-rot fungus in the effluent for a time period sufficient for the fungus to decolorize the effluent while
   (c) adding to the effluent being treated at least one member of the class consisting of nutrient nitrogen, nutrient minerals and a detergent, said at least one member being supplied in an amount sufficient to prolong the life of the white rot fungus and to increase the efficacy thereof but insufficient to cause the fungus to depart from its second metabolic state, and while at least periodically
   (d) exposing the white rot fungus to oxygen.

2. A process according to claim 1 wherein the step of providing a white rot fungus in a secondary metabolic state comprises growing the fungus in the presence of certain nutrients including nutrient nitrogen and then causing the fungus to enter the secondary metabolic state by depriving the fungus of nitrogen.

3. A process according to claim 2 wherein the fungus is grown on the surface of a carrier, at least portions of which are sequentially immersed in and withdrawn from the effluent.

4. A process according to claim 3 wherein an oxygen enriched atmosphere is maintained above the surface of the effluent so that the fungus on the surface of the carrier is exposed to oxygen when that portion of the carrier is withdrawn from the effluent.

5. A process according to claim 1 wherein the white-rot fungus is supplied with a mixture of nutrient minerals and a detergent.

6. A process according to claim 5 wherein said nutrient minerals include iron, potassium, zinc, magnesium, manganese, cobalt, sodium, calcium, aluminum and molybdenum.

7. A process of treating effluent from a pulp or paper-making operation to improve the environmental character thereof comprising the steps of
   (a) growing a white-rot fungus on the surface of a carrier in the presence of certain nutrients including nitrogen,
   (b) causing the white-rot fungus to enter a secondary metabolic state by depriving the fungus of nitrogen,
   (c) immersing the white-rot fungus in the effluent for a time period sufficient for the fungus to decolorize the effluent while periodically
   (d) exposing the white-rot fungus to oxygen atmosphere, and while
   (e) adding to the effluent being treated nutrient nitrogen at the rate of about 0.024 to about 0.036 grams per liter as nitrogen of effluent to prolong the life of the white-rot fungus and to increase the efficacy thereof.

8. A process of treating effluent from a pulp or paper-making operation to improve the environmental character thereof comprising the steps of
   (a) growing a white-rot fungus on the surface of a carrier in the presence of certain nutrients including nutrient nitrogen,
   (b) causing the white-rot fungus to enter a second metabolic state by depriving the fungus of nitrogen,
   (c) immersing the white-rot fungus in the effluent for a time period sufficient for the fungus to decolorize the effluent,
   (d) adding to the effluent being treated nutrient minerals and a detergent in an amount sufficient to prolong the life of the white rot fungus and to increase the efficacy thereof but insufficient to cause the fungus to depart from its secondary metabolic state, and while at least periodically
   (e) exposing the white rot fungus to oxygen.

9. A process according to claim 8 wherein the nutrient minerals are added to the effluent at the rate of about 0.58 grams per liter of effluent being treated.

10. A process according to claim 8 wherein the detergent is supplied to the fungus at the rate of 0.3% by volume of effluent being treated.

11. A process according to claim 8 wherein the white rot fungus is *Phanerochaete chrysosporium*.

* * * * *